(12) United States Patent
Oguma (10) Patent No.: US 11,556,173 B2
(45) Date of Patent: Jan. 17, 2023

(54) ELECTRONIC APPARATUS, METHOD FOR CONTROLLING THE SAME, AND STORAGE MEDIUM

(71) Applicant: CANON KABUSHIKI KAISHA, Tokyo (JP)

(72) Inventor: Kotaro Oguma, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/240,741

(22) Filed: Apr. 26, 2021

(65) Prior Publication Data

US 2021/0333873 A1  Oct. 28, 2021

(30) Foreign Application Priority Data

Apr. 27, 2020  (JP) .............................. JP2020-078300

(51) Int. Cl.
  *G06F 3/01*  (2006.01)
  *H04W 52/02*  (2009.01)
  *G02B 27/00*  (2006.01)

(52) U.S. Cl.
  CPC ......... *G06F 3/013* (2013.01); *G02B 27/0093* (2013.01); *H04W 52/027* (2013.01); *H04W 52/0254* (2013.01)

(58) Field of Classification Search
  CPC ............... G06F 3/013; G02B 27/0093; H04W 52/0254; H04W 52/027; Y02D 30/70; G06Q 30/0267
  See application file for complete search history.

(56) References Cited

U.S. PATENT DOCUMENTS

| | | | |
|---|---|---|---|
| 10,162,651 B1* | 12/2018 | Zhu | G06F 9/453 |
| 2014/0267034 A1* | 9/2014 | Krulce | G06F 21/32 |
| | | | 345/158 |
| 2016/0109946 A1* | 4/2016 | George-Svahn | G06F 3/04842 |
| | | | 345/156 |
| 2016/0227107 A1* | 8/2016 | Beaumont | H04N 5/23218 |
| 2016/0252957 A1* | 9/2016 | Raux | G06F 3/013 |
| | | | 345/156 |
| 2020/0201048 A1* | 6/2020 | Nakata | G09F 19/12 |

FOREIGN PATENT DOCUMENTS

JP  2019039988 A  3/2019

* cited by examiner

*Primary Examiner* — Mihir K Rayan
(74) *Attorney, Agent, or Firm* — Canon U.S.A., Inc. IP Division (57) ABSTRACT

There is provided an electronic apparatus that enables a line-of-sight detection function at an appropriate timing, thereby achieving power saving, for example. The line-of-sight detection function can be enabled with less power consumption. The electronic apparatus includes at least one memory and at least one processor which function as a line-of-sight detection unit configured to detect a line-of-sight position based on a line-of-sight of a user, and a control unit configured to perform control so that, in a state where a first content is displayed on a display unit, the line-of-sight detection unit detects the line-of-sight position of the user in response to a second content being displayed on the display unit, wherein the second content is to be displayed together with the first content.

15 Claims, 6 Drawing Sheets

FIG.4E

ELECTRONIC APPARATUS, METHOD FOR CONTROLLING THE SAME, AND STORAGE MEDIUM

BACKGROUND

Field

The present disclosure relates to an electronic apparatus configured to detect the line-of-sight position of a user depending on the presence or absence of display, a method for controlling the electronic apparatus, and a storage medium.

Description of the Related Art

In recent years, it has been known that a mobile terminal such as a smartphone displays an image called a banner serving as an advertisement or a notification on a screen, regardless of the intention of a user. Japanese Patent Application Laid-Open No. 2019-39988 discusses a technique in which the line-of-sight position of a user who uses a head-mounted display is constantly detected, and when a predetermined time has elapsed in a state where the line-of-sight of the user is within the display area of a banner advertisement, the displayed banner is hidden.

In the technique discussed in Japanese Patent Application Laid-Open No. 2019-39988, however, a line-of-sight position detection function is kept on all the time to detect the line-of-sight position of the user and thus consumes a large amount of power. If a large amount of power is consumed to detect the line-of-sight position in an apparatus such as a mobile terminal driven by a battery, there can be a situation where a main function thereof (e.g., an Internet communication function or a call function in the case of a smartphone) cannot be sufficiently utilized.

SUMMARY

Various embodiments of the present disclosure enable a line-of-sight detection function at an appropriate timing, thereby achieving power saving, for example.

According to one embodiment of the present disclosure, an electronic apparatus includes at least one memory and at least one processor which function as: a line-of-sight detection unit configured to detect a line-of-sight position based on a line-of-sight of a user, and a control unit configured to perform control so that, in a state where a first content is displayed on a display unit, the line-of-sight detection unit detects the line-of-sight position of the user in response to a second content being displayed on the display unit, wherein the second content is to be displayed together with the first content.

Further features of various embodiments of the present disclosure will become apparent from the following description of exemplary embodiments with reference to the attached drawings.

DESCRIPTION OF THE EMBODIMENTS

An exemplary embodiment of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1A:
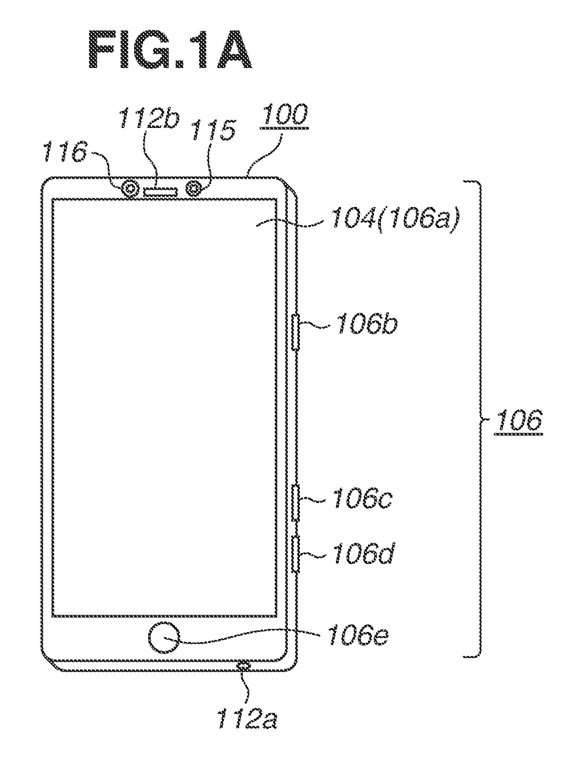
FIGS. 1A and 1B are external views each illustrating a smartphone according to an exemplary embodiment.
Figure 1B:
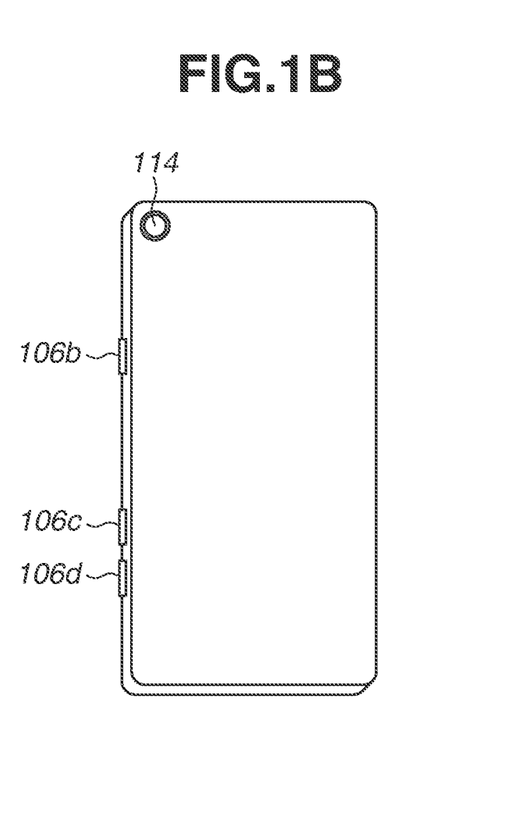

FIGS. 1A and 1B are external views of a smartphone 100 that is an example of an apparatus (electronic apparatus) according to the exemplary embodiment of the present disclosure. FIG. 1A is a front view of the smartphone 100. FIG. 1B is a rear view of the smartphone 100. In the smartphone 100 illustrated in FIGS. 1A and 1B, a display (display unit) 104 is provided on a front surface of the smartphone 100 to display an image and various kinds of information. A touch panel 106a is a touch operation member, and can detect a touch operation (a touch) on a display surface (an operation surface) of the display 104. The smartphone 100 can display, on the display 104, a live view (LV) image captured by an out-camera 114 or an in-camera 115. A power button 106b is an operation member included in an operation unit 106, and enables switching between on and off of the display 104. Continuously pressing (pressing and holding) the power button 106b for a certain amount of time, e.g., three seconds enables switching between on and off of the power of the smartphone 100. A volume plus button 106c and a volume minus button 106d are used to control the volume of sound to be output from an audio output terminal 112a or a speaker 112b. The sound volume increases when the volume plus button 106c is pressed, and decreases when the volume minus button 106d is pressed. When the out-camera 114 or the in-camera 115 is in use and the smartphone 100 is in an imaging standby state, the volume plus button 106c or the volume minus button 106d also functions as a shutter button, and a user can issue an imaging instruction by pressing the volume plus button 106c or the volume minus button 106d. The user can also make a setting so that the user can perform a desired specific function, for example, by pressing the power button 106b and the volume minus button 106d simultaneously or by pressing the volume minus button 106d quickly a plurality of times. A home button 106e is an operation button for displaying a home screen on the display 104 as a startup screen of the smartphone 100. In a case where various applications are initiated and used in the smartphone 100, pressing the home button 106e can close the applications temporarily and display the home screen. It is assumed here that a button that can be physically pressed is used as the home button 106e, but a touchable button displayed on the display 104 and having a similar function may be used in place of the physical button. The audio output terminal 112a is an earphone jack, and outputs sound to a device such as a pair of earphones or an external speaker. The speaker 112b is built in the main body of the smartphone 100 and emits sound. In a case where a terminal for outputting sound, e.g., an earphone cord is not attached to the audio output terminal 112a and sound is to be output from the smartphone 100, the sound is output from the speaker 112b.

Figure 2:
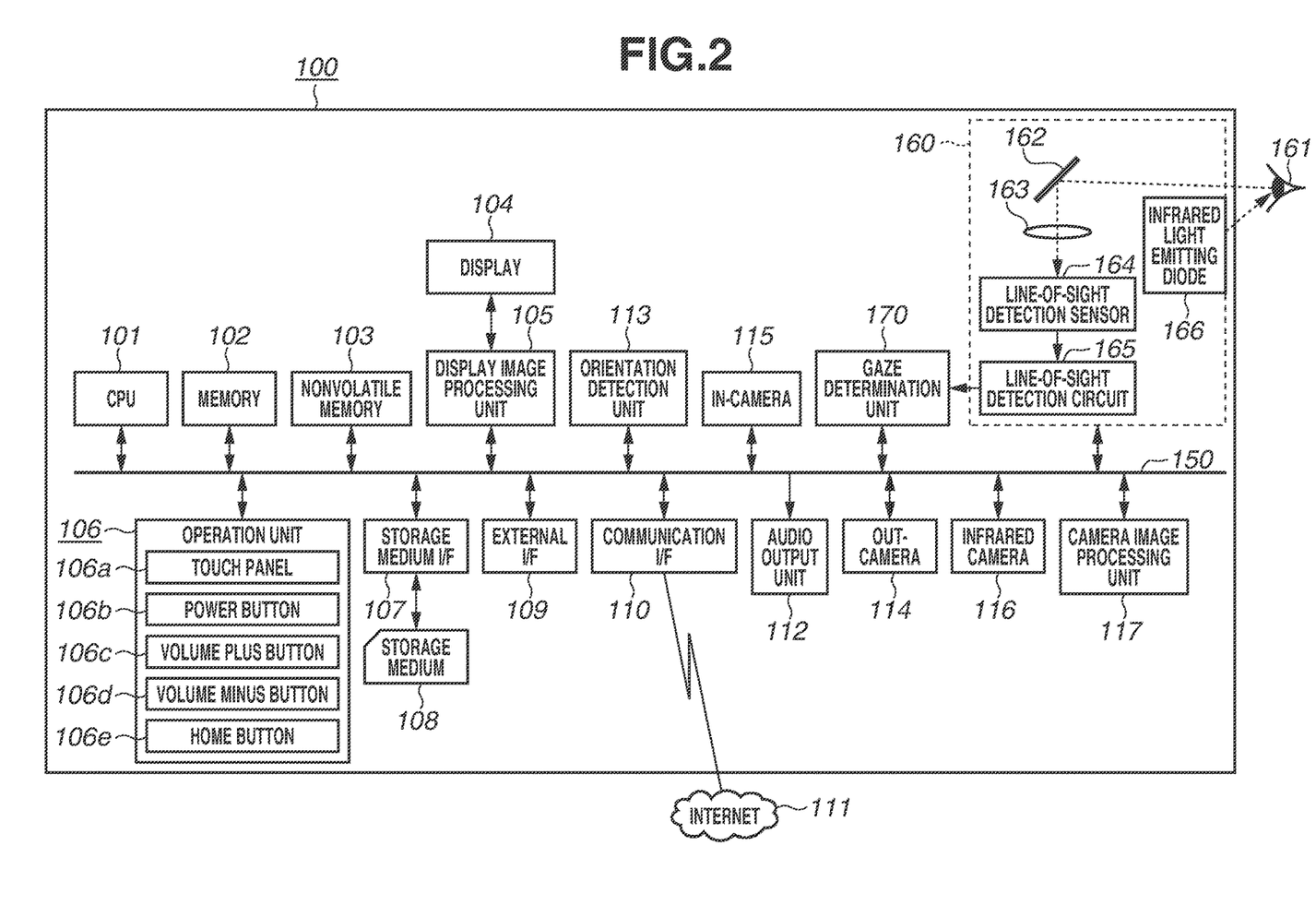
FIG. 2 is a block diagram illustrating a configuration of the smartphone according to the exemplary embodiment.

FIG. 2 is a block diagram illustrating a configuration example of the smartphone 100 according to the present exemplary embodiment. A central processing unit (CPU) 101, a memory 102, a nonvolatile memory 103, a display image processing unit 105, the display 104, the operation unit 106, a storage medium interface (I/F) 107, an external I/F 109, and a communication I/F 110 are connected to an internal bus 150. In addition, an audio output unit 112, an orientation detection unit 113, the out-camera 114, the in-camera 115, an infrared camera 116, and a camera image processing unit 117 are connected to the internal bus 150. Furthermore, a line-of-sight detection sensor 164 and a line-of-sight detection circuit 165 that are included in a line-of-sight detection block 160 as well as a gaze determination unit 170 are connected to the internal bus 150. The units connected to the internal bus 150 9 via the internal bus 150.

The CPU 101 is a control unit that controls the entire smartphone 100, and includes at least one processor or circuit. The memory 102 includes, for example, a random access memory (RAM) (e.g., a volatile memory using a semiconductor device). The CPU 101 controls each unit of the smartphone 100 based on a program stored in, for example, the nonvolatile memory 103, using the memory 102 as a work memory. The nonvolatile memory 103 stores data such as image data and audio data, and various programs to be used when the CPU 101 operates. The nonvolatile memory 103 is, for example, a flash memory or a read only memory (ROM).

The display 104 displays, for example, a graphical user interface (GUI) screen including an image and a GUI based on control by the CPU 101. The CPU 101 generates a display control signal based on a program, and controls each unit of the smartphone 100 to generate a video signal for display on the display 104 and output the generated video signal to the display 104. The display 104 displays a video image based the output video signal. The smartphone 100 may be configured to include an interface for outputting a video signal for display on the display 104 and not to include the display 104. The display 104 may be configured as an external monitor (such as a television set).

The display image processing unit 105 analyzes an image and a GUI displayed on the display 104. The display image processing unit 105 can also detect display of a banner (described below) on the display 104. As with the display 104, the display image processing unit 105 may be included in an external monitor (such as a television set).

The operation unit 106 is an input device for receiving a user operation and includes, for example, a character information input device such as a keyboard, a pointing device such as a mouse or a touch panel, a button, a dial, a joy stick, a touch sensor, and a touchpad. The touch panel 106a is a flat input device laid on the display 104 and configured to output coordinate information corresponding to a touched position. The operation unit 106 includes the touch panel 106a, the power button 106b, the volume plus button 106c, the volume minus button 106d, and the home button 106e that are described above.

A storage medium 108 such as a memory card, a compact disc (CD), or a digital versatile disc (DVD) can be attached to the storage medium I/F 107, and the storage medium I/F 107 reads and writes data from and to the attached storage medium 108 based on control by the CPU 101. The storage medium 108 may be built in the smartphone 100. The external I/F 109 is connected to an external device by a wire cable or wirelessly to input and output video signals and audio signals. The communication I/F 110 communicates with an external device and the Internet 111 to transmit and receive various kinds of data such as files and commands.

The audio output unit 112 outputs the sound of a moving image or music data, an operation sound, a ringtone, various notification sounds, and the like. While in the present exemplary embodiment, the audio output unit 112 includes the speaker 112b and the audio output terminal 112a for connecting a device such as a pair of earphones, the audio output unit 112 may output sound by wireless communication or the like.

The orientation detection unit 113 detects the orientation of the smartphone 100 relative to the gravity direction, and the inclination of the smartphone 100 relative to each of a yaw axis, a roll axis, and a pitch axis. It is possible to determine whether the smartphone 100 is, for example, held horizontally, held vertically, directed upward, directed downward, or tilted, based on the orientation detected by the orientation detection unit 113. At least one of sensors including an acceleration sensor, a gyro sensor, a geomagnetic sensor, a direction sensor, and an altitude sensor, or a combination of some of these sensors can be used as the orientation detection unit 113.

The out-camera 114 is disposed in the housing of the smartphone 100 and on the side opposite to the side where the display 104 is disposed. In FIG. 1B, the out-camera 114 is illustrated as a single camera, but is not limited thereto. A plurality of cameras having different focal lengths may be mounted as the out-camera 114.

The in-camera 115 is disposed in the housing of the smartphone 100 and flush with the display 104.

A live view video image captured by the out-camera 114 or the in-camera 115 can be displayed on the display 104. The user can select whether to capture an image of a scene before the eyes or an image of the user by himself/herself, depending on whether to use the out-camera 114 or the in-camera 115.

The infrared camera 116 is disposed in the housing of the smartphone 100 so as to be flush with the display 104 and to oppose the in-camera 115 relative to the speaker 112b. Data representing the face of the user is analyzed using the infrared camera 116, so that a depth map or an infrared image of the face is created. Thus, the infrared camera 116 can also be used to change the smartphone 100 from the locked state to the unlocked state.

The camera image processing unit 117 performs various types of image processing on a screen displayed on the display 104 and recognizes an item displayed on the display 104, based on control by the CPU 101. Each of the display image processing unit 105 and the camera image processing unit 117 can also perform various types of image processing on an image stored in the nonvolatile memory 103 or the storage medium 108, a video signal acquired via the external I/F 109, an image acquired via the communication I/F 110, and the like. The image processing to be performed by each of the display image processing unit 105 and the camera image processing unit 117 includes analog-to-digital (A/D) conversion processing, digital-to-analog (D/A) conversion processing, image data coding processing, compression processing, decoding processing, enlargement/reduction processing (resizing), noise reduction processing, and color conversion processing. Each of the display image processing unit 105 and the camera image processing unit 117 may be a dedicated circuit block for performing specific image processing. The CPU 101 can perform image processing based on a program without using the display image processing unit 105 or the camera image processing unit 117, depending on the type of the image processing.

An infrared light emitting diode 166 is a light emitting element for detecting the line-of-sight position of the user on a screen in a finder, and irradiates the eyeball (eye) 161 of the user with infrared light. The infrared light emitted from the infrared light emitting diode 166 is reflected by the eyeball (eye) 161, and the reflected infrared light arrives at a dichroic mirror 162. The dichroic mirror 162 reflects only infrared light and transmits visible light. The reflected infrared light of which optical path is changed is image-formed on an imaging surface of the line-of-sight detection sensor 164 via an imaging lens 163. The imaging lens 163 is an optical member included in a line-of-sight detection optical system. The line-of-sight detection sensor 164 includes an imaging device such as a charge coupled device (CCD) type image sensor.

The line-of-sight detection sensor 164 photoelectrically converts the reflected infrared light incident thereon into an electrical signal, and outputs the electrical signal to the line-of-sight detection circuit 165. The line-of-sight detection circuit 165 includes at least one processor, and detects the line-of-sight position of the user from an image or movement of the eyeball (eye) 161 of the user based on the signal output from the line-of-sight detection sensor 164, and outputs the detection information to the CPU 101. In this way, the dichroic mirror 162, the imaging lens 163, the line-of-sight detection sensor 164, the line-of-sight detection circuit 165, and the infrared light emitting diode 166 are included in the line-of-sight detection block 160.

In the present exemplary embodiment, a line-of-sight is detected (a line-of-sight input is received) by a method called a cornea reflection method, using the line-of-sight detection block 160. The cornea reflection method detects the direction and/or position of a line-of-sight, based on the positional relationship between the infrared light emitted from the infrared light emitting diode 166 and reflected by the eyeball (eye) 161, in particular, by the cornea, and the pupil of the eyeball (eye) 161. There are various other methods to detect the direction and position of a line-of-sight, such as a method called a scleral reflection method that utilizes the difference in light reflectance between the iris and the white part of the eye 161. Any other line-of-sight detection method may be used as long as the method can detect the direction and position of a line-of-sight. The smartphone 100 according to the present exemplary embodiment is described as including the line-of-sight detection block 160 having the infrared light emitting diode 166 as a block dedicated to detecting the line-of-sight of the user. Alternatively, the in-camera 115 and the infrared camera 116 may serve to detect the line-of-sight of the user. More specifically, the line-of-sight position of the user may be detected by detecting the orientation of the face of the user from an image captured by the in-camera 115 and by detecting the orientation of the eye of the user using the infrared camera 116. If the line-of-sight of the user can be detected using the in-camera 115 and the infrared camera 116, the smartphone 100 according to the present exemplary embodiment may not include the line-of-sight detection block 160.

The CPU 101 can detect the following operation and states based on an output from the line-of-sight detection block 160.

State where the line-of-sight of the user is input into the display 104.

State where the user is gazing at the display 104.

Removal of the line-of-sight of the user from the display 104, i.e., the end of the input of the line-of-sight.

State where the line-of-sight of the user is not input into the display 104.

The term "gaze" mentioned here refers to a case where the line-of-sight position of the user does not exceed a predetermined moving amount within a predetermined time. The gaze is determined by the gaze determination unit 170.

The operation unit 106 includes the touch panel 106a. The CPU 101 can detect the following operations and states on the touch panel 106a.

New touch of a finger or a pen on the touch panel 106a, i.e., the start of touch (hereinafter referred to as "touch-down")

State where the finger or the pen is touching the touch panel 106a (hereinafter referred to as "touch-on")

State where the finger or the pen is moving while touching the touch panel 106a (hereinafter referred to as "touch-move")

Removal of the finger or the pen from the touch panel 106a, i.e., the end of touch (hereinafter referred to as "touch-up")

State where nothing is touching the touch panel 106a (hereinafter referred to as "touch-off")

When touch-down is detected, touch-on is also detected at the same time. Normally, after touch-down, touch-on is continuously detected unless touch-up is detected. Similarly, in a case where touch-move is detected, touch-on is detected at the same time. Even if touch-on is detected, touch-move is not detected unless the touch position moves. Touch-off is detected when touch-up of every touching finger or pen is detected.

The CPU 101 is notified of information regarding any of these operations and states and the coordinates of the touch position of the finger or the pen on the touch panel 106a via the internal bus 150. Based on the information, the CPU 101 determines which of the operations (touch operations) is performed on the touch panel 106a. As for touch-move, the moving direction of the finger or the pen on the touch panel 106a can also be determined with respect to each vertical component and horizontal component on the touch panel 106a, based on a change in the coordinates of the position. In a case where it is detected that touch-move is performed by a predetermined distance or longer, the CPU 101 determines that a slide operation is performed. An operation of removing the finger from the touch panel 106a upon quickly moving the finger by some distance while keeping the finger on the touch panel 106a is called a flick. In other words, a flick is a moving operation of quickly moving a finger along the touch panel 106a. When touch-up is detected immediately after it is detected that touch-move is performed by a predetermined distance or longer at a predetermined speed or more is detected, it is possible to determine that a flick is performed (following a slide operation). Furthermore, a touch operation of simultaneously touching a plurality of points (e.g., two points) and bringing the respective touch positions closer is called "pinch-in", and a touch operation of moving the respective touch positions away from each other is called "pinch-out". Pinch-in and pinch-out are collectively called a pinch operation (or simply called a pinch). Any of various types of touch panel, such as a resistive film type, a capacitive type, a surface acoustic wave type, an infrared type, an electromagnetic induction type, an image recognition type, and an optical sensor type, may be used as the touch panel 106a. Examples of the touch detection method include a method that detects a touch when the touch panel 106a is actually touched, and a method that detects a touch when a finger or pen approaches the touch panel 106a.

A banner is an image that is created mainly for advertisement or promotion and serves to introduce another website on a web page. A link to a web page of another website is provided on this image. Selecting the image with a click operation or a touch operation displays the website introduced by the banner. The banner having such a function is called a web banner. In recent years, there have been not only a banner having a link (a Uniform Resource Locator (URL)) for shifting to another website, but also a banner for notifying a user of new information received by another application. The banner having such a function is called a notification banner. When the user selects (taps) the notification banner, the application having received the new information is executed so that the user can immediately access the new information. The banner is typically shaped like a horizontally long strip, but in recent years, there have been also a vertically long banner and a square banner. The banner is an image temporarily displayed on the display 104 and it is rare for the banner to be displayed all the time, because of the nature thereof. The banner is displayed at a specific timing (such as a timing when new information is received) to provide a notification or a recommendation to the user, and is hidden when no instruction is given to the banner by the user. In other words, it is deemed that, when the banner is displayed continuously for a certain amount of time, the user has been sufficiently notified of the information indicated by the banner. The banner is thus hidden upon the elapse of the certain amount of time.

In addition, the banner is hidden before the time elapses after the display of the banner, if the user performs a specific touch operation. For example, the banner can be hidden if a flick operation is performed in a specific direction near the banner. The direction of the flick operation for hiding the banner depends on the position where the banner is displayed. More specifically, in a case where the displayed banner is symmetrical with respect to the vertical center line of the display 104, the flick operation for hiding the banner is performed in one direction, out of the upward and downward directions, toward an edge of the display 104 closer to the banner. In a case where the displayed banner is not symmetrical with respect to the vertical center line of the display 104, the flick operation for hiding the banner is performed in one direction, out of the leftward and rightward directions, toward an edge of the display 104 closer to the banner. The flick operation for hiding the banner is performed in the direction opposite to the direction in which the banner is moved for display. For example, suppose the user holds the smartphone 100 in normal use (the speaker 112b is at the top and the home button 106e is at the bottom). In this state, in a case where the banner is moved in a direction from the top toward the bottom of the display 104 (from the side of the speaker 112b toward the side of the home button 106e) for display, the banner is hidden when a flick operation is performed in the opposite direction, i.e., the direction toward the top (toward the speaker 112b). Suppose the user holds the smartphone 100 horizontally with both hands (holds the side of the speaker 112b with the left hand and the side of the home button 106e with the right hand). In this case, when the banner is moved from the right toward the left (from the side of the home button 106e toward the side of the speaker 112b) for display, the banner can be hidden when a flick operation is performed in the opposite direction, i.e., the direction toward the right (toward the home button 106e).

In the present exemplary embodiment, control processing for controlling on or off of the line-of-sight detection function depending on whether the banner is displayed or hidden, which is performed by the smartphone 100, will be described.

Figure 3:
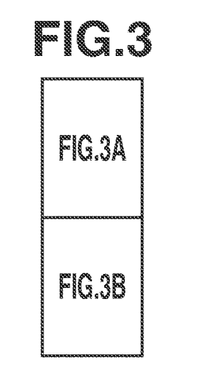
FIG. 3, consisting of FIGS. 3A and 3B, is a flowchart illustrating processing for controlling on or off of a line-of-sight detection function depending on whether a banner is displayed or hidden, according to the exemplary embodiment.
Figure 3A:
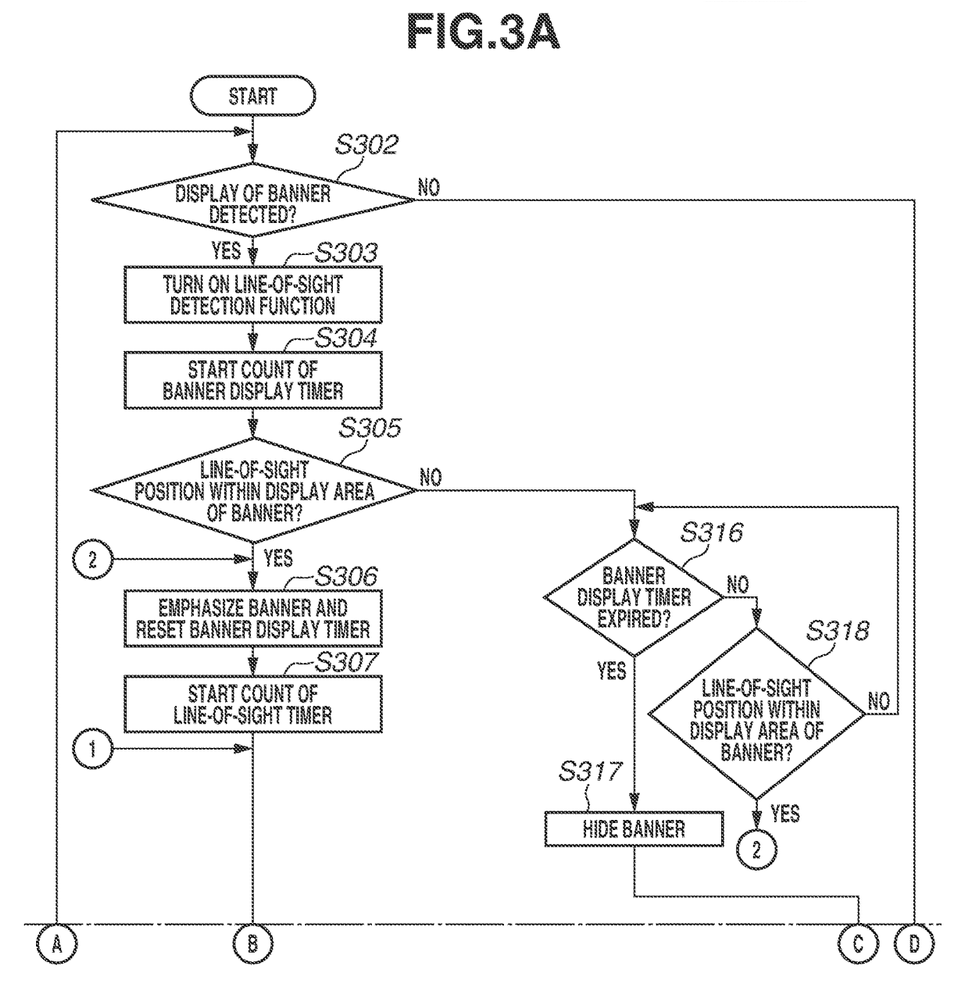
Figure 3B:
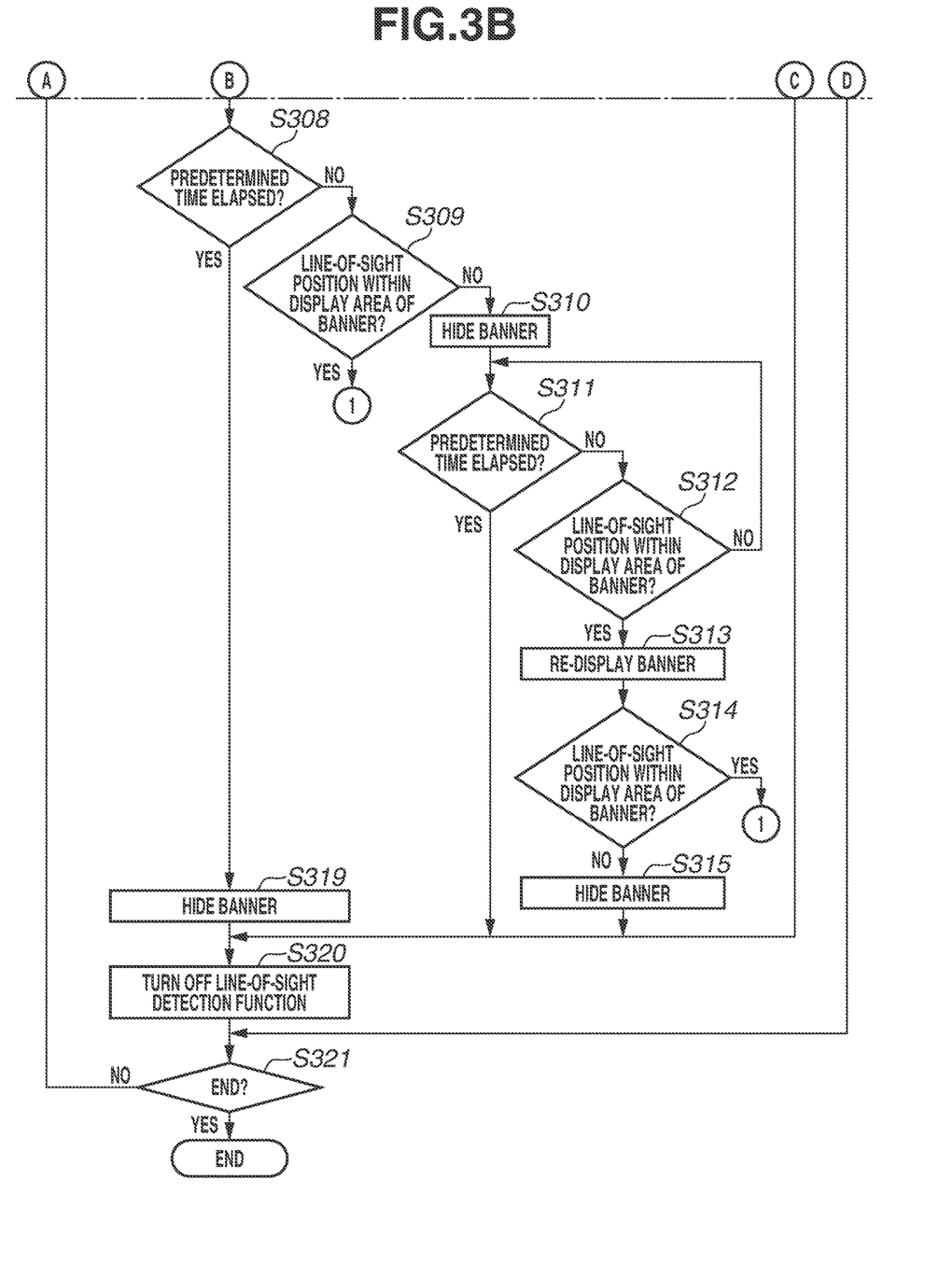

FIG. 3 is a flowchart illustrating the processing for controlling on or off of the line-of-sight detection function depending on whether the banner is displayed or hidden, in a case where the user is viewing the display 104. The control processing is implemented by the CPU 101 of the smartphone 100 loading a program stored in the nonvolatile memory 103 into the memory 102 and executing the program. The flowchart of FIG. 3 is started when the smartphone 100 is activated (powered on) and brought into a specific state. The specific state is a state where the home screen is displayed on the display 104, or a state where at least one application installed on the smartphone 100 is executed and displayed on the display 104.

Figure 4A:
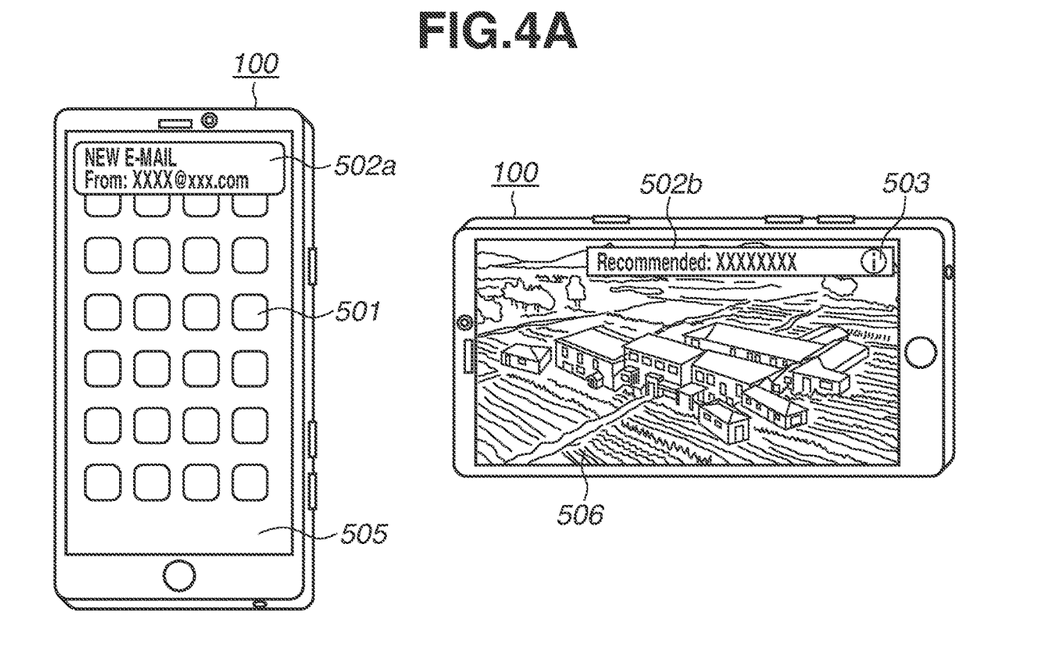
FIGS. 4A to 4E are diagrams each illustrating an example of display on a display of the smartphone according to the exemplary embodiment.

In step S302, the CPU 101 determines whether the display image processing unit 105 detects display of a banner on the display 104. If the display of a banner is detected (YES in step S302), the processing proceeds to step S303. If the display of a banner is not detected (NO in step S302), the processing proceeds to step S321. FIG. 4A illustrates examples of the case where the display of a banner is detected. In FIG. 4A, a banner 502a is displayed on a home screen 505 where an application 501 is displayed, and a banner 502b is displayed while the user is viewing a moving image 506 published on the Internet 111 using a moving image browsing application. More specifically, in a state where the home screen 505 is displayed on the display 104, the banner 502a is displayed as a notification banner that notifies the user that a new e-mail is received by a mail application installed on the smartphone 100. While the moving image 506 is played back using the moving image browsing application, the banner 502b is displayed as a web banner that recommends (promotes) the user to use content or service related to the moving image 506. When the user taps the banner 502a, the mail application is activated and the screen transitions to a page for reading the new e-mail. When the user taps the banner 502b, the screen transitions to a page for viewing a recommended video image. When the user performs a flick operation in the upward direction while the banner 502a is displayed, the banner 502a is hidden. When the user performs a flick operation in the rightward direction while the banner 502b is displayed, the banner 502b is hidden. Tapping an icon 503 displayed in the banner 502b displays detailed information of the banner 502b while keeping the moving image 506 displayed without making a transition to the page indicated by the banner 502b. Each of the banners 502a and 502b described above is an example and the banner is not limited thereto. The banner may be of other type as long as the banner is displayed without the user performing an operation, such as a notification banner for new information, an advertisement banner, or a recommendation banner.

In step S303, the CPU 101 turns on (enables) the line-of-sight detection function. In other words, the CPU 101 starts driving the line-of-sight detection block 160.

In step S304, the CPU 101 starts the count of a banner display timer for the display of the banner detected in step S302. In a case where the line-of-sight of the user is not input, the banner is hidden when the banner display timer expires.

In step S305, the CPU 101 determines whether the line-of-sight position of the user is within the display area of the banner. If the line-of-sight position is within the display area of the banner (YES in step S305), the processing proceeds to step S306. If the line-of-sight position is outside the display area of the banner (NO in step S305), the processing proceeds to step S316.

Figure 4B:
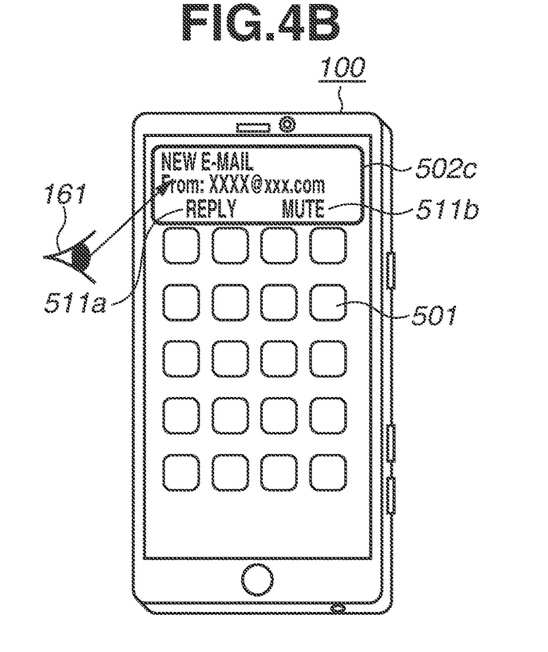

In step S306, the CPU 101 emphasizes the banner and resets the banner display timer started in step S303. FIG. 4B illustrates an example of the banner displayed when the line-of-sight position of the user is within the display area of the banner. If the line-of-sight position of the eye 161 of the user is within the display area of the banner 502a illustrated in FIG. 4A, the banner 502a is emphasized with a thick outer frame, like a banner 502c illustrated in FIG. 4B. In addition, options that can be selected by the user regarding the content indicated by the banner 502c, e.g., options 511a and 511b are displayed on the banner 502c. By tapping the option 511a, the user can send a reply to the new e-mail indicated by the banner 502c. By tapping the option 511b, the user can make a setting not to receive a notification such as the banner 502c even if the mail application receives a new e-mail. If there is no available option, the details of the information held by the banner may be displayed. This allows the user to visually recognize that the banner 502c is selected by the line-of-sight. The method for emphasizing the banner is not limited to the method used in the banner 502c of FIG. 4B. The banner may be displayed simply using a thick frame or in a highlighted manner without displaying options or detailed information. Alternatively, the banner may be displayed so as to change the color of the entire banner. In the present exemplary embodiment, because the banner is hidden when a line-of-sight timer (described below) satisfies a predetermined condition (because the line-of-sight timer is given priority), the banner display timer is controlled to be reset in step S306. Thus, while the line-of-sight position of the user is moving within or outside the display area of the banner, the banner is not hidden even if the banner display timer expires.

In step S307, the CPU 101 starts the count of the line-of-sight timer. The line-of-sight timer measures the time during which the line-of-sight position of the user stays within the display area of the banner or outside the display area of the banner. More specifically, in a case where the line-of-sight position of the user has moved from the inside to the outside of the display area, the line-of-sight timer is reset, and starts counting after the movement to the outside of the display area. The same applies to a case where the line-of-sight position has moved from the outside to the inside of the display area.

In step S308, the CPU 101 determines whether a predetermined time has elapsed since the start of the line-of-sight timer in step S307. If the predetermined time has elapsed (YES in step S308), the processing proceeds to step S319. If the predetermined time has not elapsed (NO in step S308), the processing proceeds to step S309. The predetermined time set for the line-of-sight timer is shorter than the expiration time of the banner display timer to be described below in step S316. More specifically, the predetermined time is approximately 1 to 2 seconds. Setting the predetermined time to be shorter than the expiration time of the banner display timer allows the user to hide the banner more quickly using the line-of-sight, without waiting for the expiration of the banner display timer.

In step S309, the CPU 101 determines whether the line-of-sight position of the user is within the display area of the banner, as with step S305. If the line-of-sight position is within the display area of the banner (YES in step S309), the processing returns to step S308. If the line-of-sight position is outside the display area of the banner (NO in step S309), the processing proceeds to step S310.

Figure 4C:
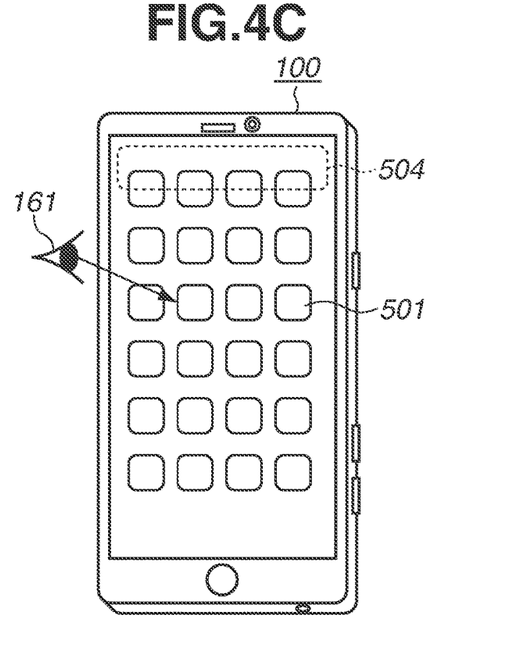

In step S310, the CPU 101 hides the banner. Based on the determination in each of step S305 and step S309, it is apparent that the line-of-sight position of the user has moved from the inside to the outside of the display area of the banner. Thus, it can be presumed that the user has looked at the content of the banner when the banner has been displayed, but the user thinks the content is not interesting or there is no need to view the content immediately. For this reason, the display of the banner detected in step S302 is hidden. In this way, for example, in a case where the user holds the smartphone 100 with the right hand, the user does not need to perform a touch operation on the banner (e.g., the banner 502a of FIG. 4A) displayed in the upper portion of the display 104 in order to hide the banner. In recent years, there has been a trend towards a larger housing of the smartphone 100, and thus it can be difficult for the user to perform a touch operation on the upper portion of the display 104 while holding the smartphone 100 with one hand. In addition, in a case where the user is viewing the moving image 506 using the moving image browsing application as illustrated in FIG. 4A, the user cannot view a part of the moving image 506 overlaid with the banner 502b. When the user moves a finger to the banner 502b to perform a touch operation to hide the banner 502b, the finger obstructs the moving image 506, thereby making it difficult for the user to visually recognize the moving image 506. In a case where the user wishes to view particularly the part of the moving image 506 overlaid with the banner 502b, the user is likely to be annoyed by the display of the banner 502b. The banner is displayed without the user performing an operation (regardless of the intention of the user) in the first place, and the user can often feel annoyed by the banner depending on the situation. For this reason, when the condition that the line-of-sight position of the user has moved from the inside to the outside of the display area of the banner before the elapse of the predetermined time is satisfied, the banner is hidden (as illustrated in FIG. 4C). This allows the user to intuitively hide the banner using the line-of-sight, without feeling annoyed by the display of the banner.

In step S311, the CPU 101 determines whether a predetermined time has elapsed since the hiding of the banner in step S310. If the predetermined time has elapsed (YES in step S311), the processing proceeds to step S320. If the predetermined time has not elapsed (NO in step S311), the processing proceeds to step S312.

In step S312, the CPU 101 determines whether the line-of-sight position of the user is within the area where the banner has been displayed before the hiding of the banner. If the line-of-sight position is within the area (YES in step S312), the processing proceeds to step S313. If the line-of-sight position is outside the area (NO in step S312), the processing returns to step S311. An area 504 illustrated in FIG. 4C corresponds to the area where the banner 502a is displayed in FIG. 4A. FIG. 4C indicates that the line-of-sight position of the eye 161 of the user is outside the display area of the banner.

Figure 4D:
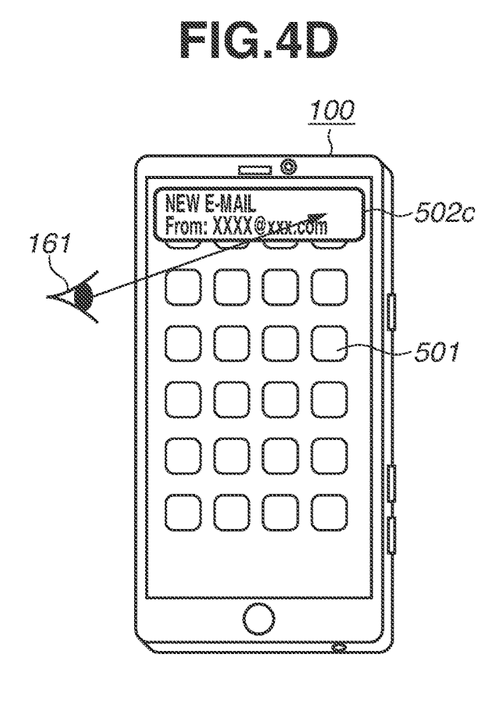

In step S313, the CPU 101 re-displays the banner hidden in step S310. The banner re-displayed at this time has the same content as that of the banner displayed in step S302. Given that the result of the determination in step S312 is YES, it is apparent that the line-of-sight position of the user has moved from the position illustrated in FIG. 4C to the inside of the area 504. In response to the movement of the line-of-sight position of the user, the banner 502c in the hidden state is re-displayed as illustrated in FIG. 4D. In a case where, after the hiding of the banner in step S310, the user looks at the display area of the banner before the elapse of the predetermined time, this can be a case where the user has viewed the content of the banner once and removed the line-of-sight, but then re-thought it necessary to view the content again and returned the line-of-sight to the display area of the banner. There is also a case where the user has removed the line-of-sight position by mistake or for a moment to view an area other than the banner. In such a case as well, hiding the banner deteriorates user operability. Thus, in a case where the user looks again at the display area of the banner immediately after the hiding of the banner, the banner is re-displayed. This allows the user to view the content of the banner again, even if the user has removed the line-of-sight position from the banner by mistake.

In step S314, the CPU 101 determines whether the line-of-sight position of the user is within the display area of the banner, as with step S305. If the line-of-sight position is outside the display area of the banner (NO in step S314), the processing proceeds to step S315. If the line-of-sight position is within the display area of the banner (YES in step S314), the processing returns to step S308.

In step S315, the CPU 101 hides the banner as with step S310. In a case where the line-of-sight position of the user has moved to the outside of the display area of the banner after the re-display of the banner in step S313, it can be presumed that the user has finished viewing the content of the displayed banner, and it is less likely that hiding the banner is against the intention of the user.

In step S316, the CPU 101 determines whether the banner display timer started in step S303 has expired. If the banner display timer has expired (YES in step S316), the processing proceeds to step S317. Otherwise (NO in step S316), the processing proceeds to step S318. The expiration time of the banner display timer is longer than the predetermined time set for the line-of-sight timer used in the determination in step S308 (i.e., the expiration time of the banner display timer>the predetermined time set for the line-of-sight timer) and is, more specifically, approximately five seconds. The expiration time of the banner display timer can be set by the user, or may be determined beforehand.

In step S317, the CPU 101 hides the banner. In the first place, the banner is hidden when the banner display timer expires unless a touch operation is performed by the user. In the present exemplary embodiment, in a state where the line-of-sight position of the user is outside the display area of the banner (NO in step S305), the banner is hidden when the banner display timer expires. However, the banner is hidden not only in step S317, but also in a case where the banner display timer expires during the processing in this flowchart.

In step S318, the CPU 101 determines whether the line-of-sight position of the user is within the display area of the banner, as with step S305. If the line-of-sight position is within the display area of the banner (YES in step S318), the processing returns to step S306. If the line-of-sight position is outside the display area of the banner (NO in step S318), the processing returns to step S316.

Figure 4E:
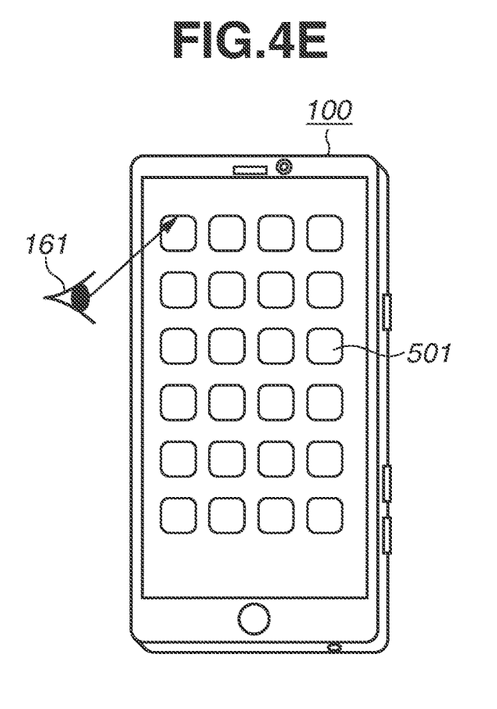

In step S319, the CPU 101 hides the banner as with step S310 (as illustrated in FIG. 4E). Because the result of the determination in step S308 is YES, it is presumed that the user has been able to sufficiently viewed the content displayed in the banner (the banner 502c illustrated in FIG. 4B). This is because, if the user wishes to know further details of the content displayed in the banner, the user is highly likely to touch the banner and transition to another screen.

In step S320, the CPU 101 turns off (disables) the line-of-sight detection function turned on in step S303. In other words, the CPU 101 terminates the driving of the line-of-sight detection block 160. The CPU 101 turns on the line-of-sight detection function (starts the driving of the line-of-sight detection block 160) in response to the display of the banner on the display 104 in step S302, and turns off the line-of-sight detection function (terminates the driving of the line-of-sight detection block 160) in response to the hiding of the banner. In this way, on or off of the line-of-sight detection function is switched depending on whether the banner is displayed or hidden, thereby improving user operability in hiding the banner while minimizing the power consumption.

In step S321, the CPU 101 determines whether the processing has ended. If the processing has ended (YES in step S321), the control processing of FIG. 3 ends. Otherwise (NO in step S321), the processing returns to step S302. The end of the processing is, for example, the transition from the application executed at the start of the control processing of FIG. 3 to another application, or the end of the application currently being executed. The end of the processing also refers to the execution of an application from the home screen, or the powering off of the smartphone 100. Specific examples thereof include a case where, in the example of FIG. 4D, the user performs a touch operation to cause a transition to the mail application.

In a case where the user performs an operation to hide the banner (a flick operation to move the banner to the outside of the screen) during the control processing of FIG. 3, the banner is hidden before the expiration of the line-of-sight timer or the banner display timer. In this case, similarly to the control processing of FIG. 3, the banner is hidden, the line-of-sight detection function is turned off, and the processing of FIG. 3 ends. In a case where the displayed banner is symmetrical with respect to the vertical center line of the display 104, the flick operation to move the banner to the outside of the screen is performed in one direction, out of the upward and downward directions, toward an edge of the display 104 closer to the banner. In a case where the displayed banner is not symmetrical with respect to the vertical center line of the display 104 (in a case where the margins to the left and right of the banner on the display 104 are not the same), the flick operation to move the banner to the outside of the screen is performed in one direction, out of the leftward and rightward directions, toward an edge of the display 104 closer to the banner. More specifically, the banner 502a illustrated in FIG. 4A is symmetrical with respect to the vertical center line of the display 104, and the banner 502a is thus hidden when a flick operation is performed in the upward direction (toward the side where the speaker 112b is disposed). On the other hand, the banner 502b is not symmetrical with respect to the vertical center line of the display 104 and is closer to the right side (the side where the home button 106e is disposed). In other words, the banner 502b can be hidden by a flick operation in the rightward direction. If the banner 502b is closer to the left side (the side where the speaker 112b is disposed), the banner 502b can be hidden by a flick operation in the leftward direction. The position where the banner is displayed varies depending on the orientation of the housing of the smartphone 100 or the type of an application being executed. Accordingly, the direction of the flick operation to be determined varies depending on the display position of the banner.

In a case where a tap operation is performed within the display area of the banner, processing corresponding to the information held by the banner is performed, the banner is hidden, the line-of-sight detection function is turned off, and then the processing of FIG. 3 ends. In a case where the tapped banner is a web banner, a website is opened in response to the tap operation based on a URL held by the banner, using the browser application. In a case where a notification banner is tapped, an application is opened based on information held by the banner.

In a case where a touch operation is performed outside the display area of the banner, processing corresponding to the touch operation and the touch position is performed and then the banner is hidden. In response to the hiding of the banner, the line-of-sight detection function is turned off and the processing of FIG. 3 ends.

As described with reference to the flowchart of FIG. 3 and FIGS. 4A to 4E, the line-of-sight detection function is turned on in response to the display of the banner on the display 104, and is turned off in response to the hiding of the banner. This allows the user to intuitively hide the banner using the user's own line-of-sight when the banner is displayed, thereby reducing the situation where the main content viewed by the user before the display of the banner becomes difficult to see due to the display of the banner. The hidden banner is re-displayed depending on the movement of the line-of-sight position of the user. In addition, the content displayed before the display of the banner is not obstructed by the hand of the user who attempts to perform a touch operation to hide the banner, so that the user can feel less annoyed. Furthermore, the line-of-sight detection function turned on in response to the display of the banner is turned off in response to the hiding of the banner, so that the power consumption can be reduced as compared with a case where the line-of-sight detection function is always kept on.

A single piece of hardware may perform the above-described various types of control performed by the CPU 101, or a plurality of pieces of hardware (e.g., a plurality of processors or circuits) may share the processing to control the entire apparatus.

The control according to the present exemplary embodiment is not limited to the examples described above with reference to FIG. 3 and FIGS. 4A to 4E, and may be the following control.

In the control flowchart of FIG. 3, the CPU 101 hides the banner when the condition is satisfied (in each of steps S317 and S319). Instead of suddenly hiding the banner, the CPU 101 slowly hides the banner by gradually increasing the transparency of the banner. In other words, the CPU 101 causes the banner to disappear gradually (fade out). The CPU 101 turns off the line-of-sight detection function in step S320 when the banner is completely hidden.

In the control in steps S310 to S315, the CPU 101 increases the transparency of the banner in step S310 (decreases the visibility) instead of hiding the banner. Accordingly, the user can feel less annoyed by the banner and also visually recognize the display position of the banner, so that the user can look at the more transparent banner if the user wishes to view the content of the banner again. If the result of the determination in step S312 is YES, then in step S313, the CPU 101 returns the display of the banner to the state in step S306 (the banner 502c illustrated in FIG. 4B). Subsequently, if the result of the determination in step S314 is NO, the CPU 101 hides the banner. If the result of the determination in step S312 is NO, then in response to the expiration of the line-of-sight timer in step S311, the CPU 101 hides the banner and turns off the line-of-sight detection function.

As described above, because the predetermined time set for the line-of-sight timer is shorter than the expiration time of the banner display timer, if the result of the determination in step S308 is YES, the CPU 101 increases the transparency of the banner (decreases the visibility) in step S319. Furthermore, in step S319, the CPU 101 starts the count of the banner display timer, and hides the less visible banner in response to the expiration of the banner display timer.

In the present exemplary embodiment, the detection of the display of a banner is used as a trigger for turning on the line-of-sight detection function, but the trigger is not limited thereto. Other type of display may be used as long as the display appears regardless of the intention of the user. For example, a pop-up for notification may be used.

In step S306, the banner display timer is reset, but may not be reset. There is a case where the line-of-sight timer cannot satisfy the above-described predetermined condition when the user frequently moves the line-of-sight up, down, left, and right. In a case where the banner display timer is not reset, even if the line-of-sight timer does not satisfy the predetermined condition, the banner is hidden in response to the expiration of the banner display timer, the line-of-sight detection function is turned off, and the processing in the flowchart of FIG. 3 ends. Thus, the user can feel less annoyed by the banner.

While an exemplary embodiment of the present disclosure has been described above in detail, the present disclosure is not limited to this specific exemplary embodiment, and various forms in a range not departing from the gist of the present disclosure are also included in the present disclosure. The above-described exemplary embodiment may also be partially combined as appropriate. While the case where the exemplary embodiment of the present disclosure is applied to the smartphone has been described as an example, the exemplary embodiment of the present disclosure is not limited to this example, and is applicable to any type of electronic apparatus as long as the electronic apparatus includes a line-of-sight detection function capable of detecting the line-of-sight direction and/or position of the user, and also can display a notification and an advertisement regardless of the intention of the user. More specifically, the exemplary embodiment of the present disclosure is applicable, for example, to a personal computer (PC), a tablet PC, a personal digital assistant (PDA), a digital camera, a portable image viewer, a printer with a display, a digital photo frame, a music player, a game machine, an electronic-book reader, a virtual reality head-mounted display (VR-HMD), and the like.

The exemplary embodiment of the present disclosure can also be implemented by executing the following processing. Software (a program) for implementing the function according to the above-described exemplary embodiment is supplied to a system or an apparatus via a network or a storage medium, and a computer (or a CPU, a micro processing unit (MPU), or the like) of the system or the apparatus reads and executes the program code. In this case, the program and the storage medium storing the program are included in the exemplary embodiment of the present disclosure.

According to the exemplary embodiment of the present disclosure, the line-of-sight detection function can be enabled at an appropriate timing, thereby achieving power saving, for example.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-078300, filed Apr. 27, 2020, which is hereby incorporated by reference herein in its entirety.

What is claimed is:

1. An electronic apparatus comprising at least one memory and at least one processor which function as:
   a line-of-sight detection unit configured to detect a line-of-sight position based on a line-of-sight of a user; and
   a control unit configured to perform control so that, in a state where a first content is displayed on a display unit, the line-of-sight detection unit detects the line-of-sight position of the user in response to a second content being displayed on the display unit, wherein the second content is to be displayed together with the first content,
   wherein the control unit performs control to hide the second content in response to the line-of-sight position of the user having been moved to an outside of a display area of the second content after the second content is displayed on the display unit without elapse of a predetermined time period in a state where the line-of-sight position of the user is within the display area of the second content.

2. The electronic apparatus according to claim 1, wherein the control unit is further configured to perform control so that the line-of-sight detection unit does not detect the line-of-sight position of the user in response to the second content being hidden after the second content is displayed on the display unit.

3. The electronic apparatus according to claim 1, wherein the control unit is further configured to perform control so that the line-of-sight detection unit does not to detect the line-of-sight position of the user in response to a predetermined time elapsing in a state where the line-of-sight position of the user is outside a display area of the second content after the second content is displayed on the display unit and then hidden.

4. The electronic apparatus according to claim 1, wherein the control unit is further configured to perform control to hide the second content in response to a time longer than the predetermined time elapsing in a state where the line-of-sight position of the user is outside the display area of the second content.

5. The electronic apparatus according to claim 1, wherein the control unit is further configured to perform control to change a display form of the second content in a case where the line-of-sight position of the user is within a display area of the second content.

6. The electronic apparatus according to claim 1, wherein a state where the control unit performs control so that the line-of-sight detection unit detects the line-of-sight position of the user is a state where the line-of-sight detection unit is enabled, and a state where the control unit performs control so that the line-of-sight detection unit does not detect the line-of-sight position of the user is a state where the line-of-sight detection unit is disabled.

7. The electronic apparatus according to claim 1, wherein the control unit is further configured to perform control to hide the second content in a case where a banner display timer expires while the line-of-sight position of the user stays outside a display area of the second content after the second content is displayed.

8. The electronic apparatus according to claim 1,
   wherein the at least one memory and the at least one processor further function as the display unit,
   wherein the control unit is further configured to perform control to display the first content and the second content on the display unit, and
   wherein the first content is main content to be displayed on the display unit, and the second content is content to be displayed temporarily on the display unit.

9. The electronic apparatus according to claim 1,
   wherein the at least one memory and the at least one processor further function as a detection unit configured to detect the second content,
   wherein the control unit is further configured to perform control so that the line-of-sight detection unit detects the line-of-sight position of the user in response to the detection unit detecting the second content.

10. The electronic apparatus according to claim 1, wherein the first content is either a home screen or a screen on which an application installed on the electronic apparatus is executed.

11. The electronic apparatus according to claim 1, wherein the second content is a banner for notifying a user that new information is received by the electronic apparatus or a banner for promoting a service.

12. An electronic apparatus comprising at least one memory and at least one processor which function as:
   a line-of-sight detection unit configured to detect a line-of-sight position based on a line-of-sight of a user; and
   a control unit configured to perform control so that, in a state where a first content is displayed on a display unit, the line-of-sight detection unit detects the line-of-sight position of the user in response to a second content being displayed on the display unit, wherein the second content is to be displayed together with the first content,
   wherein the at least one memory and the at least one processor further function as a touch detection unit configured to detect a touch operation on an operation surface, wherein the control unit is further configured to perform control to hide the second content and disable the detection of the line-of-sight position of the user in a case where a moving operation of touching and moving the operation surface in a specific direction is performed in a state where the second content is displayed, and wherein the control unit is further configured to perform control to perform processing corresponding to information indicated by the second content in a case where the touch operation is performed on the operation surface within a display area of the second content in the state where the second content is displayed.

13. The electronic apparatus according to claim 12, wherein, in a case where the displayed second content is symmetrical with respect to a vertical center line of a display surface of the display unit, the specific direction is a direction, out of upward and downward directions, toward an edge of the display unit closer to the display area of the second content, and wherein, in a case where the displayed second content is not symmetrical with respect to the vertical center line of the display surface of the display unit, the specific direction is a direction, out of rightward and leftward directions, toward an edge of the display unit closer to the display area of the second content.

14. A method for controlling an electronic apparatus, the method comprising:

detecting a line-of-sight position based on a line-of-sight of a user;

performing control to, in a state where a first content is displayed on a display unit, detect the line-of-sight position of the user in response to a second content being displayed on the display unit, wherein the second content is to be displayed together with the first content; and performing control to hide the second content in response to the line-of-sight position of the user having been moved to an outside of a display area of the second content after the second content is displayed on the display unit without elapse of a predetermined time period in a state where the line-of-sight position of the user is within the display area of the second content.

15. A non-transitory computer-readable storage medium storing a program for causing a computer to perform a method for controlling an electronic apparatus, the method comprising:

detecting a line-of-sight position based on a line-of-sight of a user;

performing control to, in a state where a first content is displayed on a display unit, detect the line-of-sight position of the user in response to a second content being displayed on the display unit, wherein the second content is to be displayed together with the first content; and performing control to hide the second content in response to the line-of-sight position of the user having been moved to an outside of a display area of the second content after the second content is displayed on the display unit without elapse of a predetermined time period in a state where the line-of-sight position of the user is within the display area of the second content.

* * * * *